(No Model.)
J. K. WORTHINGTON.
HARVESTER.
No. 360,835. Patented Apr. 5, 1887.
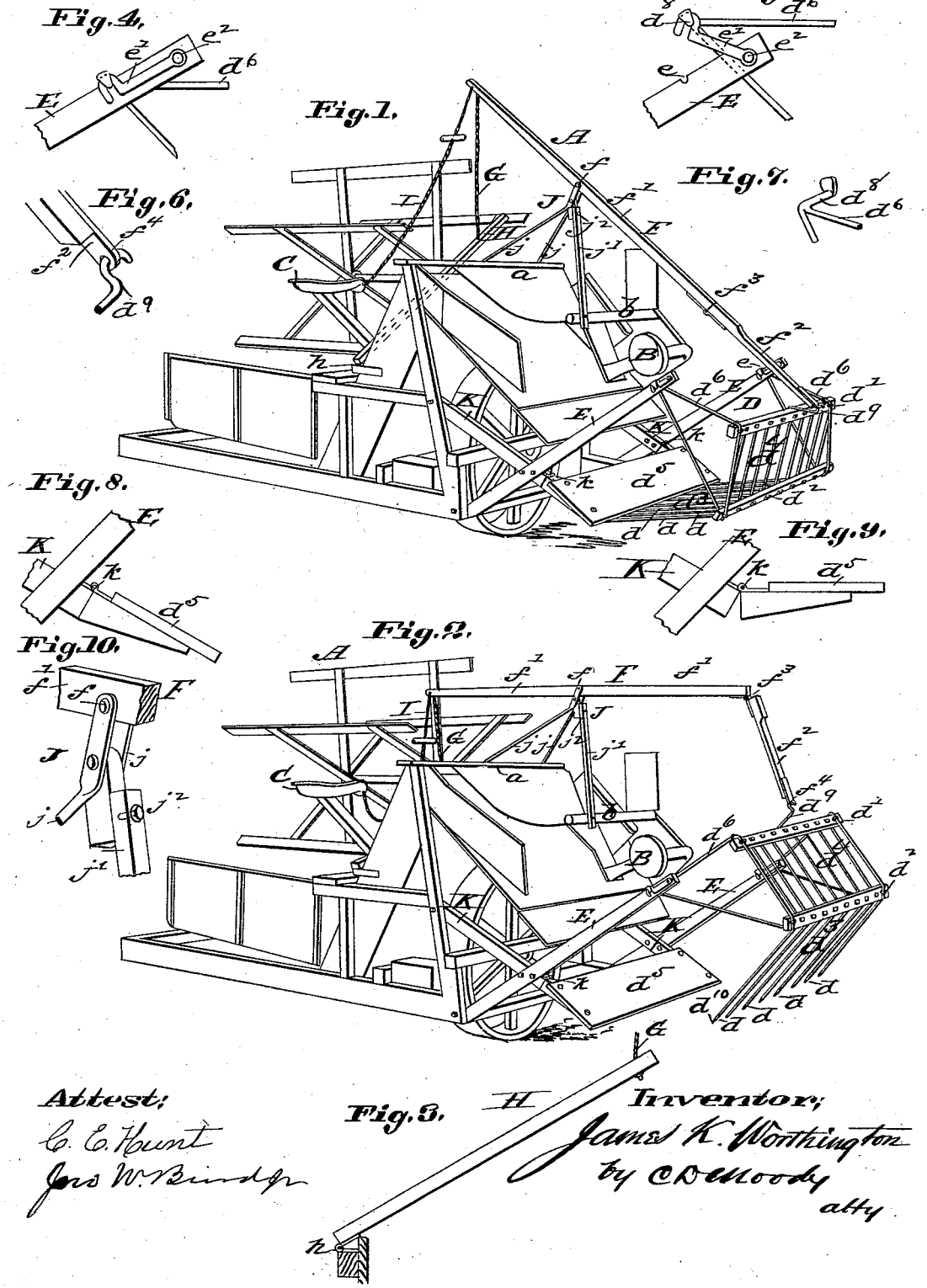

UNITED STATES PATENT OFFICE.

JAMES K. WORTHINGTON, OF KIRKWOOD, MISSOURI.

HARVESTER.

SPECIFICATION forming part of Letters Patent No. 360,835, dated April 5, 1887.

Application filed March 12, 1884. Serial No. 123,928. (No model.)

*To all whom it may concern:*

Be it known that I, JAMES K. WORTHINGTON, of Kirkwood, St. Louis county, Missouri, have made a new and useful Improvement in Harvesters, of which the following is a full, clear, and exact description, reference being had to the annexed drawings, making part of this specification, in which—

Figure 1 is a view in perspective of a harvester having the improvement; Fig. 2, a similar view in perspective, but showing the bundle-carrier opened; and Figs. 3 to 10, details, Fig. 3 being a side elevation of the pedal used in operating the bundle-carrier; Fig. 4, a side elevation of one of the bundle-carrier hinges; Fig. 5, a similar elevation, but showing the bundle-carrier arm lifted out of its bearing; Fig. 6, a view in perspective of the connection between the bundle-carrier and the lever for operating it; Fig. 7, a view in perspective of the inner end of one of the bundle-carrier arms; Fig. 8, a side elevation showing one of the arms to which the board that forms the inner side of the bundle-carrier is hinged; Fig. 9, an elevation similar to that last named, but showing the board turned upward upon its hinges; and Fig. 10, a view in perspective of the upper portion of the support of the lever for operating the bundle-carrier.

The same letters of reference denote the same parts.

The present invention is an improvement in that class of harvesters which have what are termed "bundle-carriers."

The improvement relates to the construction and mode of operating the bundle-carrier.

A represents the harvester. Saving as modified by the improvement, the harvester is of the usual description.

B represents the binder. C represents the driver's seat. These parts of the construction, as well as the harvester as a whole, are shown in a general way only, the details of the construction being familiar and not essential to an understanding of the present improvement.

D represents the bundle-carrier. The movable portion thereof is composed mainly of a series of rods, $d\ d$, which are shaped substantially as shown in Figs. 1, 2, and connected by the cross-bars $d'\ d^2$, which constitute a frame for the rods, serving both to properly connect the rods and also to enable them to be moved as one part in operating the carrier. The portion $d^3$ of the rods constitutes part of the bottom of the carrier, and the portion $d^4$ constitutes the outer side of the carrier. This movable portion of the carrier is adapted to open away from and to close toward the stationary side $d^5$ of the carrier. To this end the movable portion is provided with the arms $d^6\ d^6$, Figs. 1, 2, 4, 5. These arms at their inner ends are bent sidewise, substantially as shown in Fig. 7, so as to form journals $d^8$, which are adapted to rest so that they can be rotated in the bearings $e\ e$ in the arms E E, which project from the harvester A, as shown in Figs. 1, 2.

F represents a lever pivoted at $f$ to the harvester. It is connected at its outer end with the bundle-carrier, and its inner end extends suitably to come into the region of the driver's position. A rope, G, extends from the lever F downward to pedal H, Figs. 1, 2, 3. This pedal is hinged at $h$ to a suitable bearing upon the harvester. When the driver desires to open the bundle-carrier in order to discharge its contents upon the ground, he depresses the pedal with his foot. This causes the inner end of the lever F to be drawn downward.

The lever F is made in two parts, $f'\ f^2$, which are hinged together at $f^3$. When the inner end of the lever F is drawn downward, as described, the lever opens at the joint $f^3$ in manner similar to the opening of a rule-joint, causing the bundle-carrier arms to turn in the bearings $e\ e$ and the movable portion of the bundle-carrier to open away from the stationary portion, as shown in Fig. 2.

The lever F is preferably connected with the bundle-carrier as follows: The part $f^2$ of the lever is, preferably by means of the hook $d^9$ and eye $f^4$, (shown in Figs. 2, 6,) jointed to the upper cross-bar, $d'$, of the carrier. This enables the lever and movable part of the carrier to turn upon each other as the carrier is operated, and also enables the lever to be detached from the carrier when desired. After the carrier has been opened in the manner described sufficiently to enable its load to be discharged upon the ground, the driver withdraws the pressure from the pedal, whereupon the movable portion of the carrier swings backward again in the bearings $e\ e$ and closes against the stationary side $d^5$ into position to receive another load. Owing to the rule-joint $f^3$, the carrier remains locked in a closed position until the driver depresses the pedal, as described.

Should the bundle-carrier, in the movement of the harvester over the ground, encounter any obstacle on the ground, the difficulty is obviated by the rising of the journals $d^8$ $d^8$ in the bearings $e$ $e$, as follows: $e'$ $e'$ represent hooks pivoted at $e^2$ $e^2$ to the bars E E, and adapted to hook around, and thereby engage with the journals $d^8$ $d^8$, substantially as shown in Figs. 1, 2, 4, 5. Then, when the journals lift, as described, from the bearings $e$ $e$, the hooks $e'$ $e'$ are lifted with the journals, as shown in Fig. 5, and serve both to keep the movable portion of the bundle in connection with the arms E E, and also, when the obstacle is passed, to guide the journals downward and backward into the bearings $e$ $e$ again. The driver may also operate the lever by taking hold directly upon it or by means of a rope, I, which may extend from the inner end of the lever downward to within reach of the driver, substantially as shown in Fig. 1. By drawing this last-named rope the lever F is tilted and the carrier opened, as above described.

The support for the fulcrum $f$ is preferably a tripod, J, Figs. 1, 2, 10. Two, $j$ $j$, of the tripod-legs project from the part $a$ of the harvester. The other leg, $j'$, of the tripod is supported from the binder-frame $b$. As the binder-frame in many harvesters is adjustable in the direction of the longitudinal axis of the harvester, the leg $j'$ is pivoted at $j^2$, or otherwise suitably constructed, so as to permit of the adjustment of the binder-frame, as described. The stationary side $d^5$ of the bundle-carrier is preferably in the form of a board, as shown in Figs. 1, 2, 9, and it is attached to the arms K K, which project from the harvester-frame. As the stationary part $d^5$ of the carrier is also liable to encounter an obstruction, it is preferably hinged, as at $k$ $k$, to the arms K K. This enables the board $d^5$ to lift, as shown in Fig. 9, when the obstacle is encountered, and to drop back again into the positions shown in Figs. 1, 2, 8 after the obstacle has been passed. If the rods $d$ $d$ $d$, especially at their inner ends, $d^{10}$, encounter any obstacle, they can spring and yield independently of each other. The lever F can be readily disengaged by unhooking the eye $f^4$.

I claim—

1. The combination of the harvester A, the bundle-carrier D, the fulcrum $f$, and the lever F, whose parts are jointed together by means of a rule-joint, substantially as described.

2. The combination of the harvester A, the binder-frame $b$, the bundle-carrier D, the fulcrum $f$, and the lever F, said fulcrum being supported partly from the binder-frame $b$, substantially as described.

3. In combination with the harvester A and binder B, the tripod J, the leg $j'$ of said tripod being secured to and supported by the binder, and at the top being pivoted to the other legs of the tripod, substantially as described.

4. The bundle-carrier D, whose movable portion is attached to the arms E E, which project from the harvester, and are braced by the arms K K, which also support the side $d^5$ of the bundle-carrier, substantially as described.

5. The bundle-carrier D, having its inner side, $d^5$, hinged at $k$ $k$, to rise and fall independently of the main portion of the bundle-carrier, as and for the purpose described.

6. The combination of the arms E E, the bundle-carrier arms $d^6$ $d^6$, and the hooks $e'$ $e'$, as and for the purpose described.

JAMES K. WORTHINGTON.

Witnesses:
C. D. MOODY,
C. E. HUNT.